UNITED STATES PATENT OFFICE.

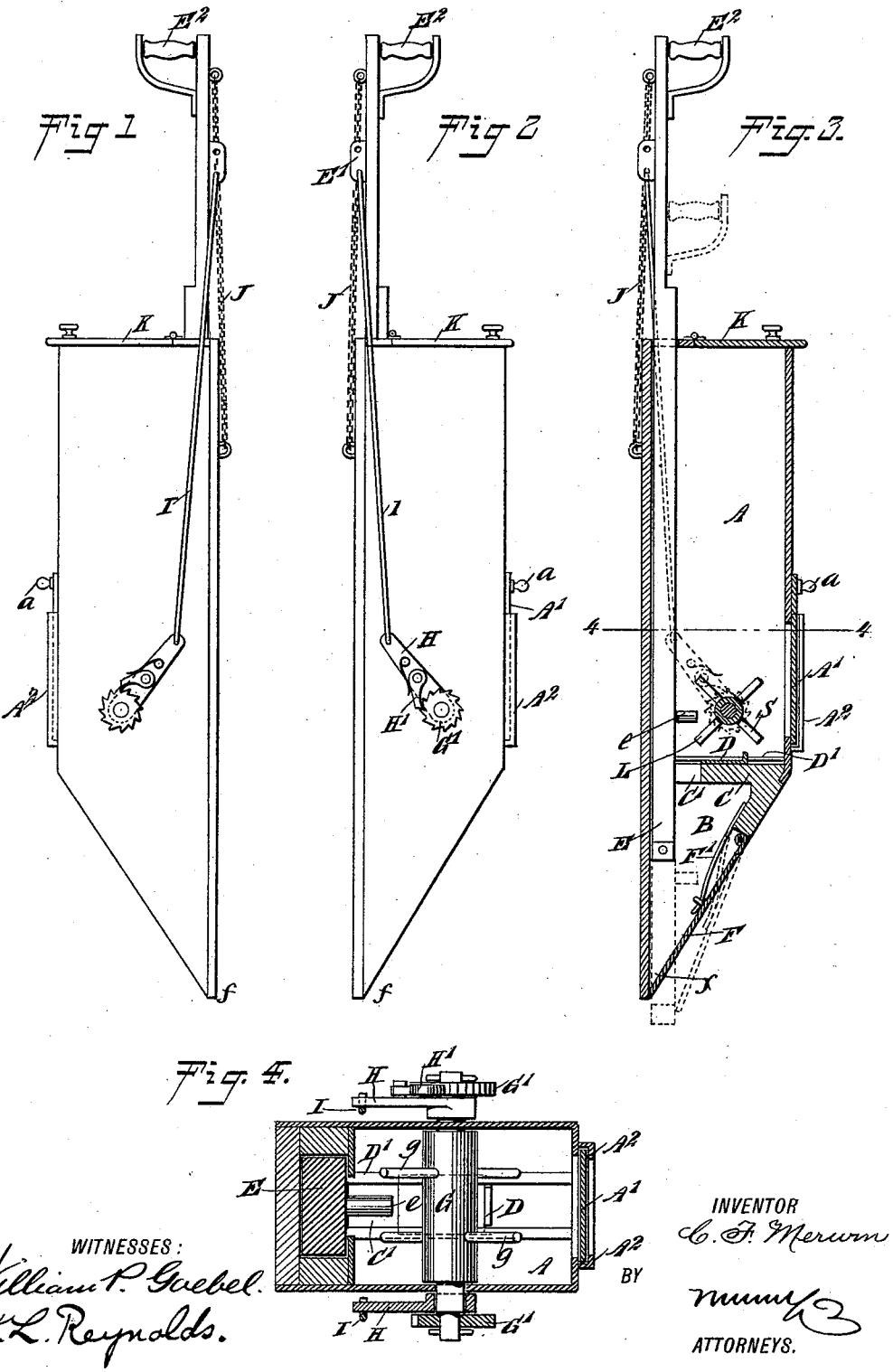

CHARLES F. MERWIN, OF KYLE, TEXAS.

HAND SEED-PLANTER.

SPECIFICATION forming part of Letters Patent No. 582,508, dated May 11, 1897.

Application filed September 22, 1896. Serial No. 606,649. (No model.)

*To all whom it may concern:*

Be it known that I, CHARLES F. MERWIN, of Kyle, in the county of Hays and State of Texas, have invented a new and Improved Hand Seed-Planter, of which the following is a full, clear, and exact description.

My invention relates to an improvement in hand seed-planters; and it consists of an arrangement of parts by which the dropping of the seed is by a forced feed, which particularly adapts the device to the planting of cotton-seed.

Reference is to be had to the accompanying drawings, forming a part of this specification, in which similar characters of reference indicate corresponding parts in all the figures.

Figures 1 and 2 are side elevations of my device from opposite sides. Fig. 3 is a vertical sectional view, and Fig. 4 is a cross-sectional or plan view upon the line 4 4 of Fig. 3.

The object of my invention is to produce a hand seed-planter which shall be particularly adapted to planting such seed as cotton. An ordinary hand-planter will not plant cotton-seed because the cotton-seed has lint connected thereto, which makes the seeds cling to each other, so that they will not separate unless forced to do so by some positive means. For this reason the ordinary hand-planter which relies upon a drop-feed will not work.

In my planter I provide a seed-chamber A, adapted to carry a supply of seed. There is below this a seed-receiving chamber B, separated from the former by a partition C. This partition C has a hole C' upon one side thereof, the size of which is capable of regulation by a slide D, sliding in guides D'. The seed-receiving chamber B is made triangle or wedge shape with the point down. One side of this chamber is composed of a plate F, hinged at the upper end and normally held closed by a spring F'. This plate might be made of spring metal, relying upon the spring of the same for closing the opening at the bottom.

A plunger or slide E passes down through both the seed-chamber and the seed-receiving chamber. It is placed so that when pushed down it will pass into the apex of the wedge or triangle of the seed-receiving head. Any seed which may be dropped into the seed-receiving chamber will fall to the apex, and when the plunger comes down the plate F will be forced to one side, as shown by dotted lines in Fig. 3, and the seed will be forced out of this chamber and into the ground. The plunger or slide E has a pin $e$ placed so that when the plunger is in its uppermost position the pin $e$ will be above the partition C between the two chambers. This pin is so placed as to pass through the slot C' in the partition and will engage the seeds lying below it and force them through the slot C'. This will happen just as the lower end of the plunger engages the seeds which were forced into this chamber by the last movement of the plunger. They will not be forced out of the seed-receiving chamber until the next stroke of the plunger. The upward motion of the plunger E is limited by a chain J or by any other suitable means, so that it will not rise above a certain point.

The upper end of the seed-chamber A is provided with a door K, by which the same may be readily filled. In the bottom of the seed-chamber A is provided a stirrer to prevent the matting or clogging of the seeds together. This consists of a cylinder or shaft G, having pins $g$ projecting through the same. This is turned by means of a ratchet-wheel placed upon either or both ends thereof upon the outside of the chamber and turned by means of the lever H and pawl H'. This lever H is connected to the slide or plunger E by means of a rod I, which engages with a projection E' upon the slide. This connection for operating the shaft G may be made to one side only or to both. I have shown it in the drawings as connected to both ends of the shaft G. In this case one arm H will operate the stirrer while the plunger is moving in one direction and the other will operate it while moving in the other direction. In consequence the stirrer will be rotated both by the upward and downward movement of the plunger. A handle $E^2$ is provided at the top of the plunger, by which the same is handled.

To provide a ready access to the bottom of the seed-chamber A, I provide a sliding door A', having a knob $a$ and sliding between guides $A^2$. It will thus be seen that the feeding device is a positive one which engages the seeds and forces them through the hole C'. This, as previously explained, is necessary with cotton-seed on account of the lint attached thereto, which causes a tendency for the seeds to cling to each other and mat together.

Having thus described my invention, I claim as new and desire to secure by Letters Patent—

1. In a hand seed-planter, the combination of a seed-chamber having an opening in one side of its bottom and a hollow pointed extension below the same having a spring-held plate which normally closes the end thereof, with a plunger working through both of said chambers and adapted to displace the end of said spring-held plate, a stirrer placed in the bottom of the seed-chamber and operated from the plunger, and a pin attached to the plunger and passing through the notch in the bottom of the seed-chamber as the plunger is forced downward, substantially as described.

2. In a hand seed-planter, the combination of a seed-chamber, a chamber located below the same having a wedge-shaped lower end, the point thereof being spring-controlled and normally closed, and a partition between the two chambers having a hole therethrough, with a plunger working through both chambers and adapted to force open the spring-point, a pin on the plunger passing through the slot in the partition, a stirrer in the seed-chamber close to the seed-opening consisting of a shaft with radial pins, a ratchet-wheel thereon, a lever and pawl, and connections from the same to the plunger, substantially as described.

CHARLES F. MERWIN.

Witnesses:
CHARLES J. BORCHERT,
WILL GROOS.